May 15, 1923. 1,455,457
E. D. TILLYER
TRIAL LENS
Filed Sept. 5, 1919
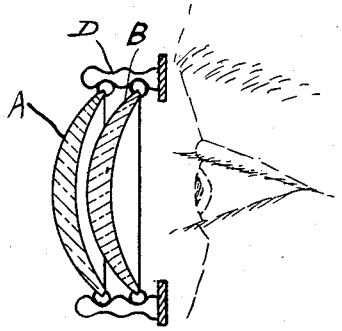
FIG. I
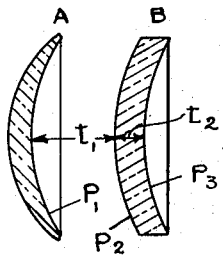
FIG. II
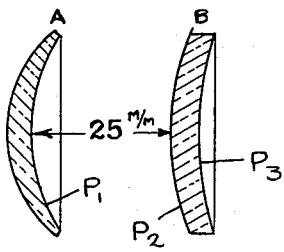
FIG. III
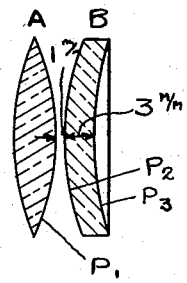
FIG. IV
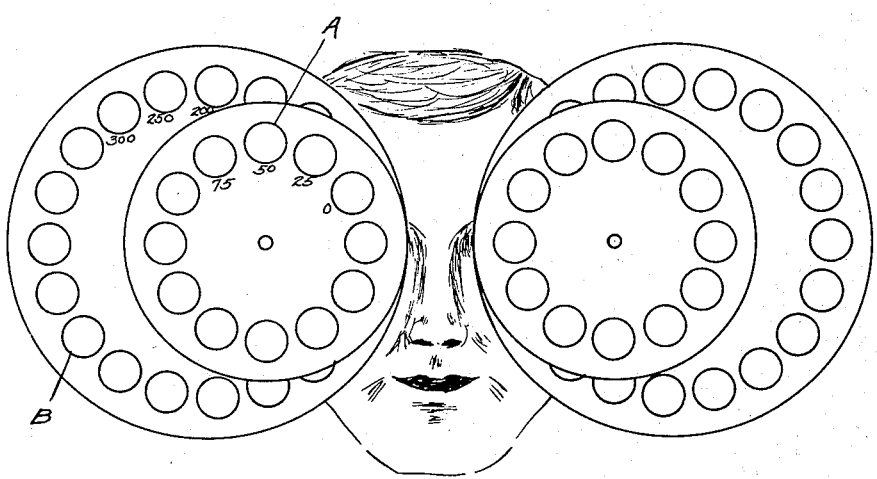
FIG. V
INVENTOR
ED. D. TILLYER
BY
H. H. Styll, ...
ATTORNEYS Patented May 15, 1923.

1,455,457

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

TRIAL LENS.

Application filed September 5, 1919. Serial No. 321,925.

*To all whom it may concern:*

Be it known that I, EDGAR D. TILLYER, a citizen of the United States, residing at Southbridge, in the county of Worcester and State of Massachusetts, have invented certain new and useful Improvements in Trial Lenses, of which the following is a specification.

This invention relates to a device for examining or testing the human eye to ascertain the ophthalmic lens necessary to correct its error of vision, and has particular reference to an eye testing device which will accurately determine the power of lens to be prescribed.

Hitherto in the testing of eyes the testing outfit known as a trial case has comprised a box or tray containing a large assortment of trial lenses of various powers and types, spheres, cylinders and prisms. These trial lenses were so shaped as to adapt their insertion in a trial frame or other eye testing device, held in place before the eyes of the patient in a manner similar to the ordinary spectacle frame. The trial frame had pockets for holding two or three of these lenses, one in front of the other, and a scale for showing the axis of the cylindrical lenses, etc. Each of the trial lenses was marked to indicate the actual power of the trial lens itself. Where the defect of the eye was a single defect usually only one trial lens would be in place before the eye, but if more than one defect were present, such as focal and astigmatic defects, a compound lens would be required, i. e., two or more of the trial lenses would be placed in the trial frame pockets before the eye and the power of the compound lens would be taken by adding the powers of the trial lenses together; that is their algebraic sum. Naturally, when lenses are placed one in front of the other, a space will intervene between them; hence because of the separation of the lens surfaces and thickness effects in practically all instances the sum of the trial lenses did not show the proper correction for the patient. Also, it is very important that an eyeglass lens be placed at a definite distance from the pupil of the eye, because the optical effects will vary with this distance; thus it will be seen where several trial lenses are used, placed one in front of the other, this distance is not the same as the final lens will occupy, and further error creeps in.

These defects of testing have been realized and certain attempts have been made to overcome them, but to do this the trial lenses were made with certain fixed requirements and limitations, such as one side at least to be flat or plane, fixed principal and nodal points, thickness, etc., making the trial lenses bulky and clumsy and correct only for a small section at the middle, and preventing the use of the desirable curved or meniscus form of lenses with their much wider angle of correct vision.

It is, therefore, one of the prime objects of my invention to overcome these difficulties and errors of the prior testing devices and to provide a testing device which will give the true and actual correction for the eye, and at the same time be free from all limitations as to specific shape, form and size and optical measurements, and which will give a wide angle of true vision instead of a very small amount at the center as hitherto has been obtainable in devices attempting to correct the trial case measurements.

It is understood that eye testing devices referred to herein include trial frames, optometer, phorometers, and other methods of holding test lenses before the eye. In my device I have not only eliminated the variation between the measurement of the instrument itself and the actual absolute eye correction, but have also provided means by which the instrument may be corrected as desired, not only at its central zones but throughout the entire field of vision.

In the earlier prior art forms of eye testing instruments it was originally, and even up to the present time is customary to make use of test lenses of a certain actual effective power, each lens being used by itself alone. By effective power in this specification is meant the optical effect or visual modification caused by a lens when placed in substantially a certain position before the eye. That is to say, ophthalmic lenses at the present day are constructed to produce when spaced a certain approximate distance from the eye of the wearer, a certain optical power or effect properly modifying the vision of the wearer. In testing it is, therefore, necessary to properly determine what regular ophthalmic lens placed in usual position before the eye will produce the necessary correction so that the effective power may be considered as the power which will produce the equivalent of the effect of a certain lens, although the lens producing that effect in the testing may be a different distance from the eye or have a different actual value, its equivalent effective value in a regular ophthalmic lens being the essential factor to be determined. Reference is made to the feature of position for the reason that while a lens in a certain position will have one effect, if the distance toward or from the eye is materially altered a different effect will be produced.

The difficulty has been when two or more lenses have been combined, as for example, a sphere and a cylinder, to determine the effective correction. This difficulty has been experienced due to the fact that there is necessarily a certain separation between the lenses so that the effective power of the combination thus produced, or in other words, the optical correction thus inserted before the eye, is not the algebraic sum of the actual powers, as indicated on the lenses, but is a different value requiring special instruments if it is to be properly determined. The result of this has been that the final prescription lens ordinarily prescribed as the algebraic sum of the several test lenses in the frame would differ in its effective power centrally from the combination with which the eye was tested, while in addition if this were made up as a marginally corrected lens, or even as a toric in place of a flat lens, the marginal effective power and aberrations would be considerably different from the effective power with which the eye was tested, so that for example a quite different reading correction might be present in the finally perfected lens from what was before the eye of the patient when tested. While certain attempts have been made to eliminate the error due to separation of the lenses, these attempts have followed along the old established lines, with the result that while the central effective power of a combination may have been improved, the methods adopted to secure this result have been increased rather than diminished the marginal astigmatism, aberration and other optical defects of the combination. In addition in the accomplishment of the central effective correction along lines hitherto attempted, inventors, through utilization of less effective principles than those forming the subject-matter of the present patent, have been compelled to tie themselves down to quite undesirable limitations as to size, shape, form and thickness of the test lenses employed.

Prior to my present invention lenses employed in the past for test purposes have been uniformly made in what is known as flat form; that is, either double concave and double convex or plano concave and plano convex. This form necessarily introduces spherical and astigmatic aberrations, coma and the like when used for testing if the eye deviates at all from the center of the lens, this defect being particularly noticeable when the reading test is being made. Ordinarily these lenses have been made of a certain rated effective power when considered individually at a certain distance, but have then been combined with no allowances made for the separation that necessarily occurred between the two lenses of the combination or the difference in distance of one of the lenses from the eye if the other were at the fixed position. It is a well recognized fact that most testing is done with positive lenses. This means that if plano convex lenses are used they are placed with the plano sides together, presenting the curved side toward the eye. This form is practically usable only with relatively small diameter lenses, because of the very serious aberrations which are introduced into the lenses, particularly in the plus series when there is even slight oblique vision through the lenses. As a lens built up in this manner a very small angle away from the exact optical axis produces great astigmatism it is a very poor form for testing purposes even if calculated to be substantially accurate on the exact axis.

It is, therefore, one of the principal objects of my present invention to provide a novel and improved series or set of test lenses which shall obviate all of the aforementioned defects, which shall provide lenses by which the eye will be tested for a certain effective power, in which the algebraic sum of the designations for the several lenses employed will indicate the true effective power of the combination thus produced, and in which the lenses themselves shall not be tied down to immutable thicknesses, curves, shapes or forms, but in which the several features going to make up the lenses shall be flexible, changeable and modifiable, as desired, to produce the most efficient and satisfactory results.

Other objects and advantages of my improved construction should be readily apparent by reference to the following specification taken in connection with the accompanying drawings, and it will be understood that I may make any modifications in the specific details and arrangement of parts or variations in the formulæ within the scope of the appended claims without departing from or exceeding the spirit of the invention.

Figure I represents a vertical sectional view through a trial frame bearing certain of my improved lenses.

Figure II represents a diagrammatic view illustrating the principles of my improvement.

Figure III is another diagrammatic view.

Figure IV is a view contrasted with Figure III diagrammatically illustrating the principles of my invention.

Figure V represents an instrument embodying my improved sets of lenses.

In the drawings, the letter A has been employed to denote the outer or anterior lens, and the letter B the posterior or ocular lens, the two lenses being shown as held in suitable frames there resting as an entirety within the trial frame supports D. If desired the letters A and B may be considered as indicating the dioptric value of the lenses concerned, which for the purposes of this patent application are immaterial. In ordinary practise the lenses of a trial set range from plus 20 dioptres to minus 20 dioptres in the spherical series, and from plus 8 dioptres to minus 8 dioptres in the cylindrical series, although any desired limits for both series may be established. Moreover, it is immaterial so far as the purposes of the present invention are concerned, whether the cylindrical series or the spherical series be placed next to the eye, so long as this point is determined before the necessary calculations for the powers of the lenses are made.

One of the essential and desirable principles of my present invention resides in the fact that while the lenses are very carefully calculated and ground to predetermined curves, the designation borne by the lens does not necessarily correspond to its effective value when used alone, since the two series, that is the ocular and the anterior series, are designed to at all times be employed in conjunction with each other. As an example of what I mean in this connection we can adopt arbitrary readily understood illustrations, as for example, considering the lenses shown in Figure I, the lens A may if desired have an actual value of plus 5 dioptres, and at the same time an indicated value of but plus 1 dioptre. This will work out absolutely satisfactorily, in that it is intended to be used with various lenses of the B series, so that the lens B shown as used in connection with it may for example be a toric having the value of a minus 4 sphere combined with a plus .50 cylinder, but may have an indicated power simply of a plus .50 cylinder. The result, however, will be that when these particular lenses A and B are placed in the relation shown in Figure I, the total resultant focal value would be a plus 1 sphere combined with a plus .50 cylinder, and this would be the prescriptive lens required to fulfil the correction determined by the use of these test lenses.

It is to be understood, however, that the foregoing example is given for purposes of illustration only and not as actual powers employed, since especial calculations are necessary to determine the actual particular effective power to be present in each lens in order to determine the final correct resultant power of the series, and these calculations ordinarily will not fall on even diopter points for the lenses of both series, although possibly varying but slightly therefrom.

In order that a method of determination of the curves to be employed may be better understood, however, I will call attention particularly to Figure II in connection with the following formula. In Figure II, I have designated the power of the lens A by the character $P_1$, the separation between the lenses A and B by the character $t_1$, the anterior surface of the ocular lens by the character $P_2$, and the ocular surface of the ocular lens by the character $P_3$, the thickness of the ocular lens being designated by the character $t_2$. Making use of these terms in connection with the well known principles of lens series calculations, we find that the power of the combination designated for convenience as X, may be expressed as follows:

$$X = P_3 + \frac{P_1 + P_2 + P_1 P_2 t_1}{1 + P_1(t_1 + t_2) + P_2 t_2(1 + P_1 t_1)},$$

which can be separated into two parts:

$$B = P_3 + \frac{P_2}{1 + P_2 t_2}$$

$$A = \frac{P_1 + P_2 + P_1 P_2 t_1}{1 + P_1 t_1 + P_1 t_2 + P_2 t_2 + P_1 P_2 t_1 t_2} - \frac{P_2}{1 + P_2 t_2}$$

Now B is the true effective power of the ocular lens, and A is the effective power of the anterior lens measured from the ocular surface of the ocular lens.

From this formula it will be noted that while of considerable length the formula for the lens A for use in the series, depends upon but two factors in the lens B, namely $P_2$ or the anterior curve of the ocular lens, and $t_2$ or the thickness of the ocular lens, and is entirely independent of the curve on the ocular side of the ocular lens, while all other factors, such as $t_1$ or the separation between the two lenses and the thickness curves, etc., on the two surfaces of the lens A, may be varied as desired, so long as these several variations are allowed for in the formulæ for calculating lens A which will then produce the desired effective power in the combination.

In order that the possibilities of variation may be graphically understood, I have shown in Figures III and IV comparative views wherein the character of the lens A and its distance from the lens B are radically different, but in which for clearness the lens B has been shown as the same in both instances, and in which the effective power of the combination is also the same in both instances.

I would call particular attention to the fact that in my improved system as illustrated the ocular lens is of meniscus or toric form in place of flat form as in all trial lenses of the prior art. This is of particular advantage in that by the use of the curved type of lens in place of the flat lens it is possible to place before the eye an improved lens which will in effect correspond closely to the obliquely corrected lenses at present largely prescribed, and may in common with that form of lens, possess the advantage of being corrected for and to a greater degree free from the objection of marginal spherical aberration and astigmatic aberration, coma or other optical defects than is the flat type of lens. It will be understood that the lenses are particularly calculated and constructed to produce these advantageous results such as accomplished for example by specially calculated marginally corrected or like improved prescription lenses, which results are not accomplishable with the flat form of test lens, and even less with the one attempt at additive lenses which require a strong convex surface on the ocular side.

I would further call attention to the fact that by the use of my improved system, a series of lenses may be constructed in which it is entirely unnecessary to maintain the standard thicknesses for the two sets of lenses, which has the disadvantage of frequently requiring the employment of additional amounts of glass to properly build up the lenses. On the other hand, with my improvement it is possible for me to vary the thickness of at least one of the sets of lenses to any desired amount, taking care of this variation by modification of the lens curves, or other points in the formula. In this manner I am able to construct my lens series of as light weight as possible, relieving the patient of undue weight of lenses and in addition rendering it unnecessary to keep the principal points and the nodal points of the series in identical positions, requiring only that the lenses correspond to the requirement that the effective power of any selected lenses of the two series when combined together shall be identical with the algebraic sum of their indicated power or powers.

While I have particularly described the present series as used in connection with sphero cylindrical or like testing, since this is the more complicated form, it will be understood that my lens series is adapted for either plain cylinder or plain spherical testing, in this event a lens of the second series having an indicated zero power being inserted in its proper position in the series, this lens being so calculated in accordance with the foregoing rules and formulæ that it will compensate for any absence or excess of power in the lens of the opposite series, and in connection with it cause the series to then have the effective power indicated on the opposed lens.

While it will be understood that the distances between the lenses of the series may be varied as desired, so far as the ultimate effect and additive value of the series is concerned, it is also to be understood that the distance between the ocular and anterior lenses is one of the quantities which must be known or determined in the calculation of the anterior lens series, and for this reason I provide a suitable support, trial frame, testing instrument, or other support for the test lenses, such as D, which will hold the lenses in predetermined position which they will always occupy with respect one to the other, so that the only variation of $t_1$ will be that occurring due to flatter or deeper curves which may be placed on the ocular side of the anterior lens, which may be varied within any possible manufacturing limits, and must be correspondingly taken care of in the calculations, the holder, however, preventing any relative variance in the position of the lenses and thus preserving the separation calculated in the formula.

It will further be understood that while for convenience of description and illustration I have shown the series whose additive values are to be considered as consisting of but two lenses, that by application of the principles herein laid out it can be extended to three or more lenses as desired, the necessary calculations for this purpose being well known to those versed in lens calculation and manufacture.

From the foregoing description it will be seen that I practically provide a compound lens system for testing the eye, in which all the necessary and desired conditions are met, such as separation of the trial lenses, distance from the eye, etc., and then mark on each lens of the system its symbol as derived from my formula, which will represent the true effective power of the required correction of the patient when the trial lens symbols are added together, although the symbol need not represent the true power of the particular trial lens on which it is placed, when the power of that lens by itself is considered.

In operation the procedure is practically unchanged from the previous methods. The test lenses are placed in their holders before the eye and changed until the correct combination for best vision is reached. Then the symbols on the test lenses are added together to give the correct power of the ophthalmic lens to be worn by the patient. The series of the test lenses are arranged in the trial case in such manner that they may be combined with each other and the addition of the symbols will give the true value of the lens to be worn, the variations of separation, distance, thickness, etc., being automatically taken care of in the computation of the curves of the test lenses and expressed in the symbols placed on each lens for the use of the person making the examination. The examination of the eye is as simple and as automatic as in the older methods of examination. The errors of the previous method are eliminated by the symbols derived by my formulæ and thus automatically disappear because the trial lenses are marked with symbols, which added together give the true effect on the eye rather than being marked with their own optical powers when considered separately by themselves.

In my invention the principal points for each combination are not coincident but the effective power of the combination is that indicated on the lenses by the sum of the symbols, which variation of the principal points allows of better and more effective forms of lenses being employed.

I claim:

1. A compound lens eye testing set, including two related series of lenses each of a different power, the curve on one side of all lenses of one series being the same and the several curves on the opposite side being selected to give correct central power and reduced marginal astigmatism.

2. A compound lens eye testing set including two related series of lenses, the curve on one side of all lenses of one series being the same and the several curves on the opposite side being selected to give correct central power and reduced marginal astigmatism, and means for holding selected lenses of two series in predetermined spaced relation, the curves of the other series being correlated to said constant curve series and separation to produce the desired additive effective power of the combination at the eye.

3. A double unit eye testing set, comprising a front series of lenses and a back series of lenses, the curve on one side of all lenses of one series being the same, and means for holding the selected lenses of two series in predetermined spaced relation, the curves of the other series being correlated to said constant curve series and separation to produce the desired additive effective power of the combination at the eye through both center and margin.

4. In a multiple unit eye testing set, a series of test lenses for selective positioning before the eye of a patient, each lens of the series having the same convex anterior curve and having differing curves on the opposite faces.

5. In a multiple unit eye testing set, a series of test lenses for selective positioning before the eye of a patient, each lens of the series having the same convex anterior curve and the same thickness and having differing curves on the opposite faces.

6. In a multiple unit eye testing set, a series of test lenses for selective positioning before the eye of a patient, each lens of the series having the same convex anterior curve and the same thickness, the ocular curves for the several lenses being different and being correlated with said constant anterior curve so that the individual lens will have the correct effect both through the center and obliquely through the margin.

7. An eye testing outfit comprising several series of lenses whose units may be selectively employed in groups, the bounding faces of said units being correctively modified from standard power curves whereby their combination additively produces the correct effect at the eye both centrally and obliquely through their margin.

8. An eye testing set comprising an ocular and an anterior lens series in which each unit of the ocular lens series has a different focal value and fulfills the formula $$B = P_3 + \frac{P_2}{1 + P_2 t_2}$$

and in which $P_2$ is a constant convex curve.

9. An eye testing set comprising an ocular and an anterior lens series in which each unit of the ocular lens series has a different focal value and fulfills the formula $$B = P_3 + \frac{P_2}{1 + P_2 t_2}$$

and in which $P_2$ is a constant convex curve and $t_2$ is also a constant for the series.

10. In apparatus for testing eyes, the combination with means for holding a spherical and a cylindrical lens in alinement with each other and in spaced relation before the eye, of a series of spherical and a series of cylindrical lenses for joint use, the lenses of one of said series all having the same thickness and anterior curve, and the lenses of the other series having their curves modified to compensate for the separation and thickness of the series to produce true effective correction at the eye.

11. In apparatus for testing eyes, the combination with means for holding a spherical and a cylindrical lens in alinement with each other and in spaced relation before the eye, of a series of spherical and a series of cylindrical lenses for joint use, the lenses of one of said series all having the same thickness and anterior curve, and the lenses of the other series having their curves modified to compensate for the separation and thickness of the series to produce true effective correction at the eye, the lenses of both series having their curves adjusted to reduce the oblique marginal astigmatism of the lens combination to within the limits of the corresponding single prescription lens, 12. An eye testing set comprising an ocular series of lenses and an anterior series of lenses each having additive power designations, and means for supporting a pair of lenses, one from each series in predetermined relation, the curves of the two series being so correlated that the effective power of any selected pair when in such relation will be the equivalent of the indicated prescription lens.

13. An eye testing set including a plurality of ocular and a plurality of anterior lenses in which each of the anterior lenses is of different power and fulfills the requirement of the formula $$A = \frac{P_1 + P_2 + P_1 P_2 t_1}{1 + P_1 t_1 + P_1 t_2 + P_2 t_2 + P_1 P_2 t_1 t_2} - \frac{P_2}{1 + P_2 t_2}$$

14. An eye testing set including an ocular and an anterior lens series, the several units of one series being adapted for selective use with the several units of the other series and in which the lenses of the two series are so related that any selected pair from the two series will give a different power and will fulfil the formula.

$$X = P_3 + \frac{P_1 + P_2 + P_1 P_2 t_1}{1 + P_1(t_1 + t_2) + P_2 t_2(1 + P_1 t_1)}$$

15. A compound lens eye testing set including two related series of lenses of different powers, the curve on one side of all lenses of one series being the same, and the several curves on the opposite side being selected to give correct central power and reduced marginal astigmatism for a predetermined separation between lenses.

16. A compound lens eye testing set including two related series of lenses of different powers, the curve on one side of all lenses of one series being the same, and the several curves on the opposite side being selected to give correct central power and reduced marginal astigmatism for a predetermined separation between lenses, and the curves of the other series being correlated to said constant curve series and predetermined separation to produce the desired additive corrective power of the combination at the eye.

17. An optical unit eye testing set comprising a front series of lenses and a back series of lenses each of different focal value, the curve on one side of all lenses of one series being the same, and the curves of the lenses of the other series being correlated to said constant curve series to produce at a predetermined separation the desired additive corrective power of the combination at the eye through both center and margin.

In testimony whereof I have affixed my signature, in presence of two witnesses.

EDGAR D. TILLYER.

Witnesses:
H. K. PARSONS,
ALICE G. HASKELL.